(12) United States Patent
Al-Azem et al.

(10) Patent No.: US 8,952,781 B2
(45) Date of Patent: Feb. 10, 2015

(54) METHOD AND APPARATUS FOR ACCESS CONTROL USING DUAL BIOMETRIC AUTHENTICATION

(75) Inventors: Samer Al-Azem, Houston, TX (US); Jack Behar, Houston, TX (US)

(73) Assignee: The Domain Standard, Inc., Houston, TX (US)

( * ) Notice: Subject to any disclaimer, the term of this patent is extended or adjusted under 35 U.S.C. 154(b) by 113 days.

(21) Appl. No.: 12/660,067

(22) Filed: Feb. 19, 2010

(65) Prior Publication Data

US 2011/0205016 A1 Aug. 25, 2011

(51) Int. Cl.
*G05B 19/00* (2006.01)
*G06F 21/32* (2013.01)
*H04L 29/06* (2006.01)

(52) U.S. Cl.
CPC ............ *G06F 21/32* (2013.01); *H04L 63/0861* (2013.01)
USPC ............................. 340/5.52; 382/116; 713/186

(58) Field of Classification Search
CPC ............... G06F 21/32; G06K 9/00892; G07C 9/00158; H04L 63/0861
USPC ...................... 235/382–382.5; 340/5.52–5.54, 340/5.82–5.85; 382/115–127; 705/67; 713/183–186
See application file for complete search history.

(56) References Cited

U.S. PATENT DOCUMENTS

| | | | |
|---|---|---|---|
| 5,770,843 A * | 6/1998 | Rose et al. ..................... 235/380 |
| 5,995,014 A * | 11/1999 | DiMaria ................... 340/825.31 |
| 6,072,891 A * | 6/2000 | Hamid et al. ................. 382/116 |
| 6,363,485 B1 * | 3/2002 | Adams et al. ................. 713/186 |
| 7,278,028 B1 * | 10/2007 | Hingoranee ................... 713/186 |
| 7,440,929 B2 * | 10/2008 | Schneider et al. .............. 706/15 |
| 8,078,885 B2 * | 12/2011 | Jobmann ...................... 713/186 |
| 8,392,965 B2 * | 3/2013 | Carter et al. ..................... 726/2 |
| 2001/0049785 A1 * | 12/2001 | Kawan et al. ................. 713/156 |
| 2002/0046336 A1 * | 4/2002 | Kon et al. ..................... 713/156 |
| 2002/0138767 A1 * | 9/2002 | Hamid et al. ................. 713/202 |
| 2002/0184538 A1 * | 12/2002 | Sugimura et al. ............. 713/202 |
| 2003/0163710 A1 * | 8/2003 | Ortiz et al. .................... 713/186 |
| 2004/0257196 A1 * | 12/2004 | Kotzin ........................ 340/5.52 |
| 2005/0063567 A1 * | 3/2005 | Saitoh et al. .................. 382/115 |
| 2006/0104486 A1 * | 5/2006 | Le Saint et al. ............... 340/5.8 |
| 2006/0277412 A1 * | 12/2006 | Mandke ........................ 713/186 |
| 2007/0005988 A1 * | 1/2007 | Zhang et al. .................. 713/186 |
| 2007/0096870 A1 * | 5/2007 | Fisher .......................... 340/5.53 |
| 2007/0241861 A1 * | 10/2007 | Venkatanna et al. ......... 340/5.52 |
| 2007/0260883 A1 * | 11/2007 | Giobbi et al. ................. 713/168 |
| 2008/0002861 A1 * | 1/2008 | Yano et al. .................... 382/115 |
| 2009/0238418 A1 * | 9/2009 | Sato ............................. 382/115 |

(Continued)

*Primary Examiner* — Benjamin C Lee
*Assistant Examiner* — Stephen Burgdorf
(74) *Attorney, Agent, or Firm* — Yee & Associates, P.C.

(57) ABSTRACT

A biometrically authenticated access control in which a wireless authentication signal is provided from a primary instrumentality of access, only after a dual-stage biometric verification of the user's identity is performed. In one embodiment, an accessing device includes memory for storing a device identification code and an authentication code, along with first and second biometric templates corresponding to biometric samples from a user. In another embodiment, an accessing device includes memory for storing a device identification code and more than one authentication code, for separate users, along with first and second biometric templates corresponding to biometric samples from multiple users. In order to gain access to a secured resource, a user undergoes first and second biometric sampling to generate biometric data to be compared with the first and second biometric templates.

10 Claims, 2 Drawing Sheets

(56) References Cited

U.S. PATENT DOCUMENTS

| | | | |
|---|---|---|---|
| 2009/0292927 A1* | 11/2009 | Wenzel et al. | 713/185 |
| 2010/0156596 A1* | 6/2010 | Herder | 340/5.82 |
| 2010/0311390 A9* | 12/2010 | Black et al. | 455/410 |
| 2011/0109433 A1* | 5/2011 | Kuenzi et al. | 340/5.73 |
| 2012/0174214 A1* | 7/2012 | Huang et al. | 726/19 |
| 2012/0262275 A1* | 10/2012 | Schultz | 340/5.83 |

* cited by examiner

METHOD AND APPARATUS FOR ACCESS CONTROL USING DUAL BIOMETRIC AUTHENTICATION

FIELD OF THE INVENTION

The present invention relates generally to access control systems, and more particularly to an access system employing biometric authentication.

BACKGROUND OF THE INVENTION

Access control systems are used in many situations where it is desired to restrict access to a physical location or to a secured system, such as a computer. One example of an access control system is the common garage door opener, which utilizes a remote, keyless radio-frequency (RF) transmitter to actuate a motorized garage door opener. Another example is the common "key-card" security system for selectively unlocking doors, gates, or other barriers to entry into buildings or other secured locations.

Typical access control systems are essentially insecure systems. A fundamental problem with granting access to a secured physical location or to a secured system using conventional methodologies is that anyone in possession of the instrumentality of access (a conventional key, the transmitter of a garage door opener, or an electronic access security card, for example) can be granted access to the secured location or system. In the case of systems or physical locations protected by a password-based system, anyone in possession of the password can gain access. That is, in most systems, once the instrumentality of access is obtained by any person, there is no further verification to ensure that that person is in fact the person who is actually authorized to be granted access.

Known systems also tend to be inconvenient. The number of different PINs and passwords a person has to remember seems to increase daily. Since most people do not want to remember dozens of different passwords, using one or two easy-to-remember passwords for all services becomes the norm. That, in itself, is insecure, since PIN codes and passwords that are easy to remember are also more easily obtained surreptitiously, e.g., by "social engineering," or guessing. A person's use of the same password for several accounts or services also compromises security. Keys, key fob transmitters, card-keys and the like present their own problems, a primary one being that they are physical items that can be lost, stolen, and damaged.

In recognition of the deficiencies among known access control systems, it is becoming increasingly common to include biometric information among the criteria used to grant or deny access to a secured location or system. Among all the biometric techniques, fingerprint-based identification is the oldest method, one that has been successfully used in numerous applications. Each individual is known to have unique, essentially immutable fingerprints (extreme trauma or surgical measures aside). A fingerprint is made of a series of ridges and furrows on the surface of the finger. The uniqueness of a fingerprint can be determined by the pattern of ridges and furrows as well as the minutiae points. Minutiae points are local ridge characteristics that occur at either a ridge bifurcation or a ridge ending. Fingerprint biometrics is a dynamic technology that is being adopted into new markets and applications at a rapidly increasing pace. Depending on the applications, users can simply touch or slide their finger over a sensor for access to their personal computers, wireless devices, workplaces or homes. Fingerprint biometrics has emerged as the most popular biometric technology to protect critical computer information as it enables convenient security for desktop and internet applications. Miniature fingerprint sensors lock out any unauthorized individual while allowing a convenient way for the authorized user to gain access without the need for passwords for system login or access. These same sensors can be used to personalize computers, enabling companies to confidently implement identity access management systems, or to allow parents to control the Web sites or other content accessed via the computer by their children.

Biometric technologies other than fingerprint recognition have been used or proposed in the prior art. These include, without limitation, physiological biometric methodologies such as face recognition, hand and palm geometry, iris recognition (which has largely supplanted retinal scanning), and behavioral methodologies such as typing rhythm, gait, and voice recognition (which is in a sense both physiological and behavioral), and handwriting recognition. As used herein, the term "biometric" is used to refer to methods for uniquely recognizing humans based upon one or more intrinsic physical or behavioral traits; that is, biometrics refers to the use of any characteristic or feature that is unique to a single individual person and that cannot as a practical matter be possessed or replicated by any other person. Unfortunately, inherent to all sensors used in the various available biometric technologies are what are termed False Accept Rates or False Match Rates (collectively referred to hereinafter as "FAR"). FAR is when a system incorrectly matches the biometric input to a non-matching template in the relevant database and, as a result of that incorrect match, incorrectly accepts an invalid input.

Biometrics in access control systems such as residential or commercial door locks and time and attendance systems have seen rapid market expansion in recent years as home and business owners struggle to overcome several common problems associated with previous generation solutions. Many businesses and government organizations need to restrict access in parts of their facilities to employees with special clearances, or track employee time and attendance on the job. Also, homeowners have expressed concern about house keys being unknowingly copied for use in a burglary.

When embedded into door locks, smart card readers or similar devices, fingerprint sensors lock out intruders and unauthorized individuals and restrict access for special clearance locations. Notably, this restriction can be realized even for persons who come into possession of a primary instrumentality of access, such as a key (mechanical or electronic), or a remote transmitter. New advanced biometric security devices can be tied into an organization's computer network to control access throughout an entire building, campus or company.

SUMMARY OF THE INVENTION

In view of the foregoing, the present invention relates to biometrically authenticated access control in which an activation signal is provided from a primary instrumentality of access, only after a dual-stage biometric verification of the user's identity is performed. In one embodiment, an accessing device includes memory for storing a device identification code and an authentication code, along with first and second biometric templates corresponding to biometric samples from a user.

In accordance with one aspect of the invention, in order to gain access to a secured resource, a user undergoes first and second biometric sampling to generate biometric data to be compared with the first and second biometric templates.

Upon authentication of the user by positive matches with said first and second biometric samples, the accessing device communicates the accessing device identification code and authentication code to a remote station controlling access to the secured resource.

In accordance with another aspect of the invention, a central server maintains a central database of records each establishing a correlation between an enrolled accessing device's identification code and an authentication code assigned to that accessing device. According to a predetermined protocol, one or more records from the central database are communicated to one or more remote stations for storage in memory at the remote stations.

In accordance with another aspect of the invention, a remote station receives requests for access to a secured resource in the form of an accessing device identification code and a corresponding authentication code. In response to such a request, the remote station retrieves a record from its memory corresponding to the received accessing device identification code and performs a comparison between the authentication code in the retrieved record and the authentication code received as part of the request for access. If a match is found, the remote station activates a security mechanism to permit access to the secured resource.

In accordance with another aspect of the invention, the administration of two biometric challenges to a user attempting to access a secured resource provides an unexpected flexibility for the system to achieve different overriding objectives depending upon the implementation. In one embodiment, the system can be programmed to achieve the objective of the lowest possible false authorization rate. In another embodiment, the system can be programmed to achieve the objective of the lowest possible false denial-of-access rate by providing two opportunities for a user to be biometrically authenticated.

BRIEF DESCRIPTION OF THE DRAWINGS

The present invention is best understood with reference to the following detailed description of embodiments of the invention when read in conjunction with the attached drawings, in which like numerals refer to like elements, and in which.

DETAILED DESCRIPTION OF A PREFERRED EMBODIMENT OF THE INVENTION

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering and programming practices for the environment in question. It will be appreciated that such development efforts might be complex and time-consuming, outside the knowledge base of typical laymen, but would nevertheless be a routine undertaking for those of ordinary skill in the relevant fields.

Figure 1:
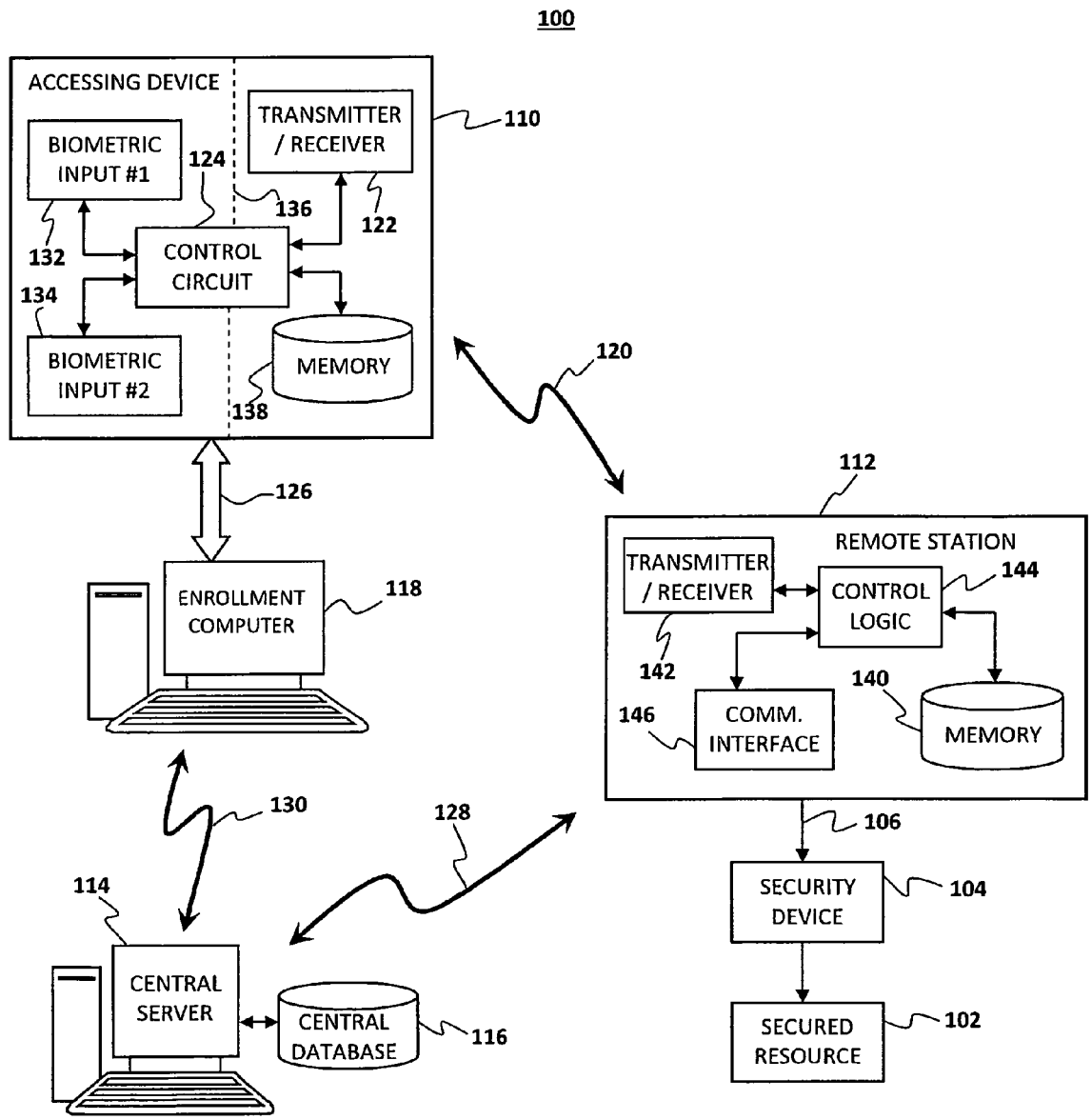
FIG. 1 is a functional block diagram of an access control system in accordance with one embodiment of the invention.

Referring to FIG. 1, there is shown a functional block diagram of an access control system 100 in accordance with one embodiment of the present invention. Fundamentally, system 100 functions to control access to a secured resource 102 to which access is controlled by means of a security device 104. As used herein, the term "secured resource" will be understood to encompass a variety of objects, locations, or systems. A secured resource may be, for example, a physical location, such as a building, or a room in a building, in which cases the security device comprises a locking mechanism on a door. A secured resource may be an outdoor location, protected by a fence with a locking gate. A secured resource may be a garage or parking area, where the security device comprises a garage door or vehicle barrier. A secured resource may be a computer or a computer network, where the security device comprises a microprocessor or other electronic circuitry programmed to selectively restrict utilization of the resource.

In each case, there will be a primary instrumentality of access to the secured resource. Various instrumentalities are contemplated. For example, a security mechanism (the security device) may be selectively opened or released using a conventional key, a "card-key" or "smart-card," a radio-frequency transmitter, an alphanumeric code entered into an electronic keypad, and so on, as would be apparent to persons of ordinary skill in the art. In accordance with one aspect, the invention is adapted to impose a secondary level of access control even to persons who may be in possession of the primary instrumentality of access, i.e., persons having the necessary key, electronic card, radio-frequency transmitter, alphanumeric code, or the like.

Various types of security mechanisms are contemplated, depending upon the resource being secured. If the secured resource is a building or like structure, the security mechanism may comprise a lockable door. If the secured resource is an outdoor area, the security mechanism may comprise a fence having a lockable gate. If the secured resource is an electronic resource, such as a computer, the security mechanism may comprise circuitry for prohibiting access unless authorization is granted. It is possible for one secured resource to be situated within or behind another secured resource. It is possible for multiple security mechanisms to be used to secure one secured resource.

Preferably, and in accordance with the presently disclosed embodiment of the invention, the security mechanism is actuated by means of one or more electronic signals. FIG. 1 shows security device 104 receiving an actuating signal (or code) via an input 106. An example of this is the electrical signal that is supplied to the motor of an electric garage door opener. Another example is the electrical signal that (de)activates an electromagnetic latch on a door.

With continued reference to FIG. 1, a complete system 100 includes at least one accessing device which is utilized by a user to gain access to a secured resource 102, as will be hereinafter described. A single accessing device 110 is shown in FIG. 1, although it is to be understood that in many implementations, a system 100 will include a plurality of accessing devices 110, with each accessing device 110 personalized to a particular individual user as will be hereinafter described.

System 100 further includes one or more remote stations 112, with which an accessing device 110 communicates when access to a secured resource 102 is desired. In the disclosed embodiment, each remote station 112 corresponds to at least one, and perhaps more than one, secured resource 102. Again, a complete system 100 may include a plurality of remote stations 112, although only a single remote station 112 is shown in FIG. 1.

System 100 further includes a central computer or server 114 which is responsible for maintaining a central database of information 116 as will be hereinafter described.

Finally, system 100 preferably includes at least one enrollment computer 118, which is involved in the process of enrolling individual accessing devices 110 into system 100. Those of ordinary skill in the art will appreciate that as described herein, the functionality of an enrollment computer 118 may be performed by a plurality of enrollment computers in different physical locations. Moreover, central server 114 may serve directly as an enrollment computer 118.

In the presently disclosed embodiment, an accessing device 110 communicates with a remote station 112 by means of a communications link 120, which in one embodiment is a conventional radio-frequency (RF) communications link. To this end, each accessing device 110 includes transmitter/receiver (transceiver) circuitry 122 that operates under control of control and processing circuitry 124. Control and processing circuitry 124 can take many forms, including, without limitation, custom integrated circuitry, microprocessor-based circuitry, programmed gate array circuitry, application-specific integrated circuitry (ASIC), and so on. It is believed that persons having ordinary skill in the art and having the benefit of the present disclosure would be readily able to implement control and processing circuitry 124 suitable for controlling operation of an accessing device as disclosed herein.

During operation of system 100 in an enrollment mode, to be described below, it is necessary for an accessing device to be in communication with an enrollment computer 118 (or with central server 114 functioning as an enrollment computer). This communication is represented by link 126 in FIG. 1, and may be implemented as a direct connection between accessing device 110 and enrollment computer 118, such as through a conventional USB connection or the like. Wireless communication between accessing device 110 and enrollment computer 118 is also contemplated.

Indeed, as used herein, the term "communicating" in the sense of communicating a signal or information from one point to another, may encompass any manner of conveying information between two points, such as, without limitation: by physical means, such as by inserting a key into a keyhole to turn the tumbler of a lock; by typing a predetermined access code into the keypad or keyboard of a controller; by communicating information such as a predetermined access code or user identification to a receiving device via a network such as a local- or wide-area computer network or the Internet; by making a physical and/or electrical connection such as via a serial port, USB connector or the like between the access device and a circuit adapted to receive information via the connection; by transmitting a information such as a predetermined access code via radio frequency signals to a receiver adapted to extract the encoded information; by passing a bar code representing information such as an access code in front of a bar code scanner adapted to extract information encoded in the bar code; by swiping a magnetic stripe across a reader designed to extract magnetically-encoded information from the magnetic stripe, or by placing a radio-frequency identification (RFID) device in proximity to an RFID scanner/reader.

With continued reference to FIG. 1, it is further preferable for each remote station 112 to communicate with central server 114, as represented by link 128 in FIG. 1. Link 128 is preferably a Global System for Mobile Communications (GSM) connection permitting communications to occur over long geographic distances. This enhances the ability of systems in accordance with certain embodiments of the invention to control access to resources remotely located throughout the world, if necessary. The GSM Standard underlies the most widely used communications networks in the world, and it is believed that to persons of ordinary skill in the art having the benefit of the present disclosure, it would be a matter of routine engineering to implement a communications channel such as represented by reference numeral 128 in FIG. 1. GSM is but one example of technology suitable for establishing link 128 between central server 114 and one or more remote stations 112 as described herein. Standard TCP/IP communication via an Internet Service Provider (ISP), that is, a conventional or secured Internet connection, may also be used to implement communications link 128 in FIG. 1.

It is also preferable for any computer acting as an enrollment computer 118 (system 100 may include multiple enrollment computers 118) to be capable of communicating with central server 114. This communication is represented by link 130 in FIG. 1. In various embodiments, link 130 is implemented as a conventional or secured Internet connection, or as a GSM network connection, or by any other suitable means, as would be apparent to persons of ordinary skill in the art having the benefit of the present disclosure. Together, links 126 and 130 place each accessing device 110 in communication (albeit indirectly) with central server 114, and vice-versa.

As shown in FIG. 1, associated with each accessing device 110 are first and second biometric input systems 132 and 134. Biometric input systems 132 and 134 are each adapted to take a biometric sample from a user of the accessing device 110. For example, in one embodiment biometric input 132 comprises a fingerprint scanner/analyzer and biometric input 134 comprises a voice print scanner/analyzer.

In the illustrative embodiment of FIG. 1, biometric input systems 132 and 134 are integral with accessing device 110. In such an embodiment, accessing device 110 comprises a handheld unit, similar to a key fob or to a conventional personal digital assistant (PDA) or cell phone device, that is equipped with dual biometric scanning functionality. For example, accessing device 110 may have a small fingerprint scanner for obtaining a fingerprint scan and a microphone for recording a voice sample. Accessing device 110 in such embodiments would likewise have the necessary control circuitry to process the biometric scans to produce biometric templates corresponding to the scans. Biometric scanning systems, for both obtaining and processing biometric scans, are commercially available from numerous sources, and it is believed that it would be a matter of routine engineering for a person of ordinary skill in the art to implement biometric inputs 132 and 134 to perform the biometric scanning and processing functions described herein.

In an alternative embodiment of the invention, the functional blocks comprising accessing device 110 as shown in FIG. 1 are divided into separable halves, as represented by dashed line 136 in FIG. 1. As shown, dashed line 136 separates biometric inputs 132 and 134, and a portion of control circuitry 124, from another portion of control circuitry, a transceiver 122, and a memory unit 138. In certain alternative embodiments, the two "modules" of accessing device 124 are separable; for example, the module containing the transceiver 122 and some control circuitry 124 ("the transceiver module") may be a module which plugs into the module containing the biometric inputs 132 and 134 and control circuitry 124 ("the biometric module"). In such an embodiment, a single biometric module could be used to service a plurality of different transceiver modules. Moreover, the overall size and power consumption of the transceiver modules can be minimized by providing the biometric inputs 132 and 134 in a separate (separable) module.

There are two modes or phases of operation of system 100. The first is an enrollment mode, wherein an accessing device is conditioned to operate in the dual biometric access control mode of one embodiment of the invention, and wherein a particular accessing device 110 is personalized to an individual user. The second is a "normal" or operational mode, wherein the accessing device is utilized by a user to gain access to a secured resource.

The enrollment mode involves personalizing an accessing device to a specific individual user, and is initiated by placing the accessing device 110 in communication with an enrollment computer 118 via link 126. As previously noted, this link 126 may be implemented as a conventional USB connection between accessing device 110 and enrollment computer 118, but may be implemented using alternative technologies, such as BlueTooth, RF signals, serial data ports, GSM, and so on, depending upon the application.

Upon activation in enrollment mode, accessing device 110 will be caused to obtain two biometric samples from the user. In the illustrative embodiment, the two biometric samples are fingerprint and voice scans. The biometric data is processed by control circuitry 124 (perhaps with the processing assistance of enrollment computer 118) to obtain first and second biometric templates corresponding to the user's biometric information. Those of ordinary skill in the art will recognize that a biometric template provides a set of reference values that serves as the basis for comparison with later-obtained biometric data to ascertain whether there is a match between the scanned data and the stored template.

In accordance with one aspect of the invention, two separate biometric templates are created, for example, one for a user's fingerprints and one for a user's voice. Preferably, the voice template is sufficient to perform not only voice recognition, but voice authentication, wherein the identity of the user is authenticated or verified through comparison of a voice sample to the stored template.

With continued reference to FIG. 1, once the biometric templates for the user(s) are created, they are stored in memory 138 associated with the accessing device 110. In addition, the users' biometric templates are communicated by link 126 to the enrollment computer 118, and from there via link 130 to the central server, where the user's/users' names and biometric templates are stored in central database 116.

In addition to storing the biometric templates, accessing device 110 may further be configured to create an accessing device identification number (ID) and a unique authentication code. Alternatively, the ID can be generated by the enrollment computer 118 and transmitted to the accessing device 110 during the enrollment process. These numbers are stored on enrollment computer 118 and/or stored in memory 138, as well as being provided by the enrollment computer 118 to central server 114 for storage in central database 116. Between them, the accessing device's ID and authentication code uniquely identifies both the particular accessing device 110 that is enrolled, as well as the identity of the individual(s) associated with the enrollment, i.e., the individuals whose biometric data was used to create the templates stored in memory 138. As such, accessing device 110 is capable of being used to allow multiple users, each with a unique authentication code, access a secured resource.

In accordance with one aspect of the invention, central server 114 executes software for assigning and organizing the access rights for all individuals who are enrolled in system 100. In one embodiment, a record is created for each enrolled individual, with the record including the individual's name, his or her biometric templates, and the ID and the authentication code(s) for the users' accessing device. The record further preferably includes information identifying all secured resources 102 to which the individual is to be granted access upon dual biometric verification, as well as the times and/or dates that any given individual is to be granted access to such resources upon dual biometric verification.

In accordance with another aspect of the invention, the individual records in the master database 116 are periodically uploaded via link 128 for storage in memory 140 associated with each remote station. Each remote station 112 is preferably equipped with a communications interface for establishing a link 128 with central server 114. This uploading of records can take place in batch mode (i.e., periodically), or on demand as requested from a given remote station 112, or, for example, each time a record is entered or modified in master database 116. Among the advantages of storing access control data in memory 140 of each remote station is that communication over link 128 may not be necessary when access is requested at a remote station, provided that the access control record for the individual requesting access has previously been uploaded from the central database 116 to the remote station.

Figure 2:
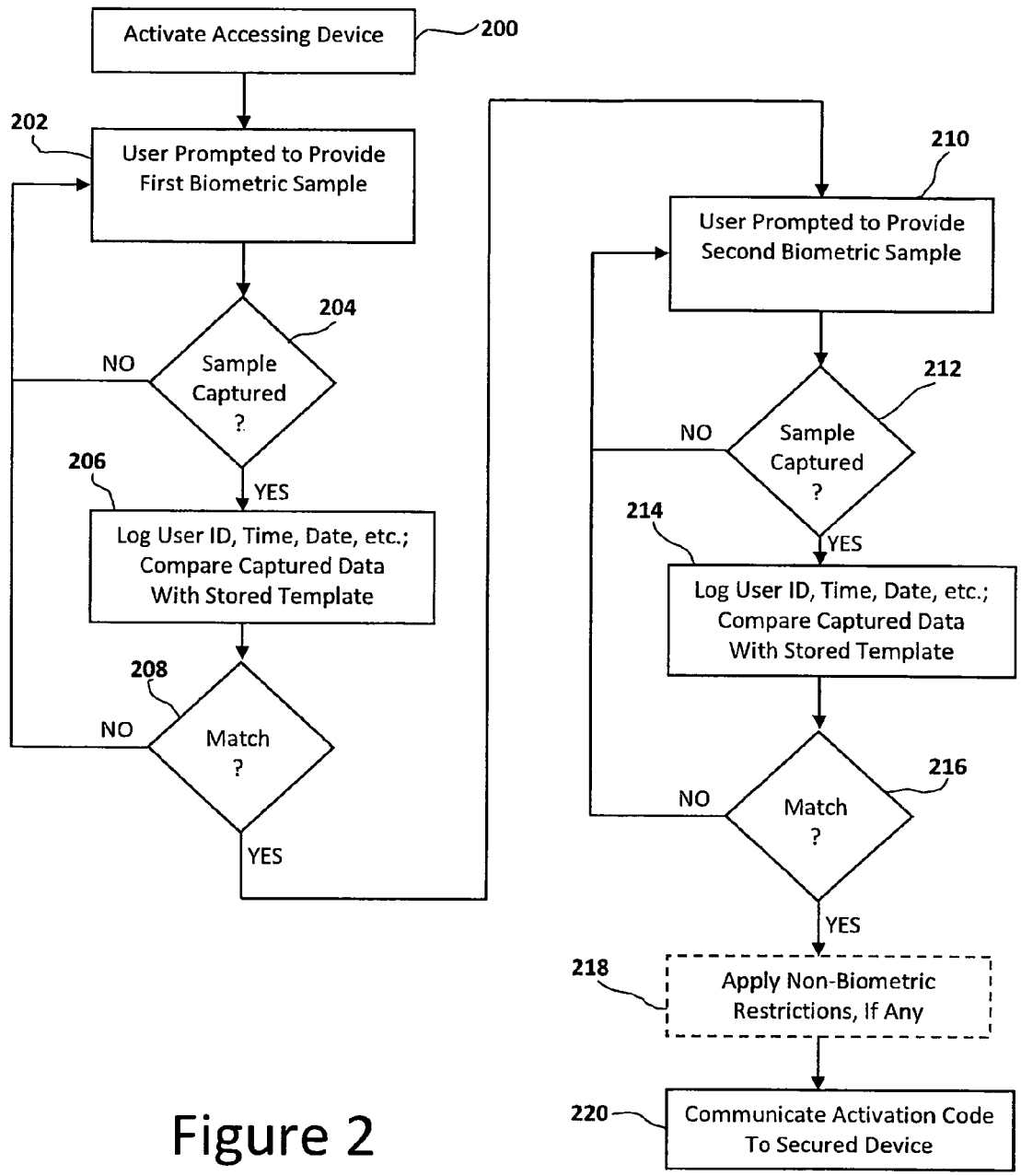
FIG. 2 is a flow diagram illustrating operation of the access control system from FIG. 1.

Referring to FIG. 2, there is shown a flow diagram of operation of system 100 when an enrolled user seeks access to a secured resource 102. First it is necessary to, in some manner, activate accessing device 110, as represented by block 200 in FIG. 2. This might be accomplished, for example, by pressing a button on the activating device 110. Next, as represented by block 202, the user is prompted to provide a first biometric sample.

It is to be understood that the possibly separable nature of the biometric module and the transceiver module of accessing device 110 is such that prior to step 202, it may first be necessary to couple the transceiver module carried by the user with a biometric module that may also be carried by the user but may also be located at the remote station. The latter case has the advantage that one biometric module can be provided that provides the biometric functionality for any transceiver module carried by an enrolled user.

In any case, once the user is prompted for the first biometric sample (step 202), the process waits for the sample to be taken (block 204). In the illustrative example, the first biometric sample is a fingerprint scan, requiring the user to place his thumb or finger on a fingerprint scanning pad. Again, the hardware for performing the biometric scanning can be incorporated integrally into a unitary accessing device 110, or the biometric functionality can be implemented in a separate module which interfaces with the remaining functional components of accessing device.

In any case, once the first biometric sample is taken, control circuit 124 logs certain information (date, time, etc.) and compares the sampled biometric data with the biometric template stored in memory 138. This is represented by block 206 in FIG. 2. If accessing device finds a match between the scanned biometric data and the stored template (decision block 208), the process proceeds to block 210, where the user is prompted for a second biometric sample. If no match is found at block 208, the process returns to block 202 prompting the user to provide another biometric sample (fingerprint scan).

In the illustrative embodiment, the second biometric sample is a voice scan, where the user is prompted to say one or more words into a microphone associated with biometric input 134. Once the second sample is taken (block 212), control circuit logs date, time and other information and compares the sampled data (voice data) with the biometric template stored in memory 138. This is represented by block 214 in FIG. 2. If no match is found (block 216), the process returns to block 210 where the user is prompted to repeat the second biometric scan.

On the other hand, if the second biometric scan proves to match the stored template, the process can optionally proceed to the subsequent step 218 of applying one or more additional, non-biometric restrictions to the access request. This step could entail any of a variety of actions, from having a photograph taken, to entering an additional alphanumeric passcode, to initiating a waiting period.

In accordance with an aspect of the invention not expected by persons of ordinary skill in the art prior to having the benefit of the present disclosure, the independent administration of two biometric challenges or scans provides the inventive system with flexibility to achieve differing results as desired from implementation to implementation. In one implementation, the objective of ensuring the lowest possible FAR is achieved by requiring the two biometric scans to be administered and passed in succession, perhaps within a predetermined period of time. In another implementation, the goal of minimizing FAR can be achieved by providing for repeated attempts of either or both scans, or even by providing for scanning of a further biometric parameter in the event that either of the first two are not passed. In fact, an unexpected result of the inventive system's administration of two biometric challenges was that the FAR was shown, through repeated tests, to have been virtually eliminated. It is believed that persons of ordinary skill in the art having the benefit of the present disclosure would readily appreciate how different system objectives can be obtained through appropriate programming of the constituent systems, and that such programming would be a matter of routine engineering to those of ordinary skill in the art.

To achieve the system objective of ensuring the lowest possible FAR, the system is preferably programmed to deny access to a secured resource unless two separate biometric scans are successfully validated. On the other hand, to achieve the different objective of ensuring the lowest possible likelihood of a user being falsely denied access to a secured resource, the system is preferably programmed to permit access only if one or both biometric scans fail to be validated, or fail to be validated after a given number of attempts, or even if only one biometric scan can be validated, be it the first or the second one administered.

With continued reference to FIG. 2, following successful completion of the (at least) two biometric scans (and any other restrictions from block 218), the control circuitry causes transmitter/receiver (transceiver) 122 to transmit the ID and authentication code assigned to the accessing device during the enrollment process. This is represented by block 220 in FIG. 2.

The authentication code may first be encrypted prior to its transmission. The accessing device ID and authentication code (encrypted or otherwise) are received by a transmitter/receiver 142 associated with remote station 112. Control logic 144 in remote station 112 uses the accessing device ID to perform a look-up in local memory 140 for the valid authentication code corresponding to the identified ID. The control logic 144 then unencrypts (decrypts) the transmitted authentication code (if necessary) and performs a comparison with the stored authentication code. If a match is found, the control logic 144 causes the appropriate signal(s) to be issued on link 106 to activate security device 104 and thereby giving the authenticated user access to the secured resource 102.

When remote station receives an ID and encrypted authentication code from an accessing device 110, it is possible that local memory 140 will not store an entry for the identified accessing device 110. In this case, the remote station can use link 128 to communicate directly with the central server 114 to ascertain whether the identified accessing device 110 has been properly enrolled in the system. Central server 114 can then provide the remote station with the valid authentication code (assuming the identified accessing device is actually enrolled in system 100), or instruct remote station 112 to deny access to the secured resource.

From the foregoing disclosure, it should be apparent that a method and apparatus for access control involving dual biometric authentication has been disclosed. Although a specific embodiment of the invention as well as possible variants and alternatives thereof have been described and/or suggested herein, it is to be understood that the present disclosure is intended to teach, suggest, and illustrate various features and aspects of the invention, but is not intended to be limiting with respect to the scope of the invention, as defined exclusively in and by the claims, which follow.

Indeed, it is contemplated and to be explicitly understood that various substitutions, alterations, and/or modifications, including but not limited to any such implementation variants and options as may have been specifically noted or suggested herein, including inclusion of technological enhancements to any particular method step or system component discovered or developed subsequent to the date of this disclosure, may be made to the disclosed embodiment of the invention without necessarily departing from the technical and legal scope of the invention as defined in the following claims.

What is claimed is:

1. An access system comprising:
   a remote an accessing device comprising:
       a first biometric input system configured to obtain a first biometric sample from a user, the first biometric sample being of a first type of biometric information;
       a second biometric input system configured to obtain a second biometric sample from said user, the second biometric sample being of a second type of biometric information, wherein the first biometric input system is different than the second biometric input system, and wherein the first type of biometric information is different than the second type of biometric information;
       control and processing circuitry, coupled to said first biometric input system and said second biometric input system, and configured to verify an identity of said user by comparing the first biometric sample to a first template stored on the accessing device and by comparing the second biometric sample to a second template stored on the accessing device,
           wherein the control and processing circuitry logs the time the first biometric sample is obtained and the time that the second biometric sample is obtained in memory connected to the control and processing circuitry,
           wherein the second biometric sample is obtained within a predetermined time after the first biometric sample is obtained, and
           wherein the identity of the user is verified only if at least both the first biometric sample matches the first template and the second biometric sample matches the second template, wherein a verified user is established; and
       a first communications unit, coupled to the control and processing circuitry, configured to transmit an accessing device identification code and an authorization code corresponding to the verified user to a remote station; and
   the remote station comprising:
       second communications equipment configured to receive the accessing device identification code and the authorization code corresponding to the verified user from the accessing device;

an access system configured to grant physical access to an area, the access system comprising a securing mechanism; and a processor in communication with the second communications equipment and the access system, the processor configured to:

determine whether the authorization code corresponding to the verified user matches a pre-stored code assigned in correspondence with the accessing device, and if a match exists, determining that the verified user is an authorized user; and command the access system to grant access to the verified user only if the verified user is also the authorized user.

2. The access system of claim 1, wherein the accessing device comprises an access card.

3. The access system of claim 1 wherein the remote station comprises a keypad configured to receive entry of a predetermined access code.

4. The access system of claim 1 wherein the second communications equipment is further configured to transmit and receive data with respect to a central server.

5. The access system of claim 4, wherein the central server is configured to maintain a database of records, wherein each record establishes a correlation between the accessing device identification code and an authentication code that identifies the user.

6. The access system of claim 5, wherein the central server is further configured to communicate at least one record in said database of records to the second communications equipment.

7. The access system of claim 4 wherein the processor is further configured to cause the second communications equipment to transmit the accessing device identification code and the authorization code corresponding to the verified user to a central server, and wherein determining whether the verified user is an authorized user comprises receiving in response from the central server a code which indicates whether the verified user is the authorized user.

8. A method comprising:

receiving, at a first biometric input system of an accessing device, a first biometric sample from a user, the first biometric sample being of a first type of biometric information;

logging in a memory of the accessing device a first time when the first biometric sample is obtained;

receiving, within a predetermined time at a second biometric input system of the accessing device, a second biometric sample from the user, the second biometric sample being of a second type of biometric information, wherein the first biometric input system is different than the second biometric input system, and wherein the first type of biometric information is different than the second type of biometric information;

logging in the memory of the accessing device a second time when the second biometric sample is obtained;

verifying, using control and processing circuitry of the accessing device and connected to the first biometric input system and the second biometric input system, an identity of the user as a verified user using both the first biometric sample and the second biometric sample, wherein the user is verified only if at least both the first biometric sample matches a first template stored on the accessing device and the second biometric sample matches a second template stored on the accessing device;

transmitting, from a communications unit of the accessing device wherein the communications unit is connected to the control and processing circuitry, an accessing device identification code and an authorization code corresponding to the verified user to a remote station controlling access to an area, wherein the remote station is different than the accessing device;

comparing the authorization code corresponding to the verified user to a pre-stored code assigned in correspondence with the accessing device, and if a match exists, determining that the verified user is an authorized user; and granting, by the remote station, access to the area only if the verified user is determined to be an authorized user.

9. The method of claim 8 wherein the remote station includes second communications equipment and wherein determining that the verified user is an authorized user comprises:

transmitting from the second communications equipment the accessing device identification code and the authorization code corresponding to the verified user to a central server; and receiving, from the central server, a code which indicates whether the verified user is the authorized user.

10. The method of claim 8 wherein comparing the authorization code corresponding to the verified user to the pre-stored code assigned in correspondence with the accessing device is performed by the remote station.

* * * * *